United States Patent [19]
Bühn et al.

[11] Patent Number: 5,245,655
[45] Date of Patent: Sep. 14, 1993

[54] METHOD AND A DEVICE FOR THE PROTECTED TRANSMISSION OF DATA

[76] Inventors: Willi Bühn, Widenbüelstrasse 9, 8617 Mönchaltdorf; Erich Näf, Büelstrasse 4, 8165 Schöfflisdorf, both of Switzerland

[21] Appl. No.: 583,044

[22] Filed: Sep. 14, 1990

[30] Foreign Application Priority Data

Sep. 18, 1989 [CH] Switzerland ............... 3378/89

[51] Int. Cl.⁵ .................. H04N 1/44; H04L 9/00; G09C 5/00
[52] U.S. Cl. .......................... 380/18; 380/9; 380/49; 380/51; 380/55
[58] Field of Search ............. 380/3, 4, 9, 18, 49, 380/50, 51, 55

[56] References Cited

U.S. PATENT DOCUMENTS

| | | | |
|---|---|---|---|
| 3,969,830 | 7/1976 | Graham | 380/54 |
| 4,091,423 | 5/1978 | Branscome | 380/18 |
| 4,339,820 | 7/1982 | Stockburger | 371/53 |
| 4,463,250 | 7/1984 | McNeight et al. | 235/385 |
| 4,821,321 | 4/1989 | Bramley | 380/18 X |
| 4,896,355 | 1/1990 | Iggulden et al. | 380/18 X |
| 4,912,761 | 3/1990 | Tan et al. | 380/18 |
| 4,916,739 | 4/1990 | Iggulden et al. | 380/18 X |
| 4,985,919 | 1/1991 | Naruse et al. | 380/18 |
| 4,989,244 | 1/1991 | Naruse et al. | 380/18 X |

FOREIGN PATENT DOCUMENTS 0278740 8/1988 European Pat. Off.
3230201 2/1984 Fed. Rep. of Germany.
1604504 1/1972 France.
2439444 5/1980 France.

Primary Examiner—Bernarr E. Gregory

[57] ABSTRACT

A ciphering device (1) encodes the original data and converts it into signals for an output device (5) that creates a document (6, 10) out of them. This document is fed into a sending device (12) that scans the data (7) line by line and converts the result into signals that are transmitted to a receiving device (13) via a transmission link (14). The receiving device (13) produces a copy (15) of the document (6, 10) out of the transmitted signals, which is fed into a reading device (17). This device converts the data into signals for a deciphering device (18) which decodes the data and converts it into signals for an output device (20). From them, the output device (20) restores the original data and makes it available for further processing.

The transmitting device (12), the receiving device (13) and the transmission link (14) form a telecopying system. The encoding of data (7) is done by using a code that is insensitive to transmission errors of the telecopying system and, in particular, to distortions in the line feed direction. The code is preferentially binary with logical values contrasting in brightness and/or color, for instance it is a bar code with bars (9) parallel to the line feed, and it can be read be a reading device (17).

The parts of the system in a transmitting-end device or a receiving-end device are preferentially integrated.

13 Claims, 1 Drawing Sheet

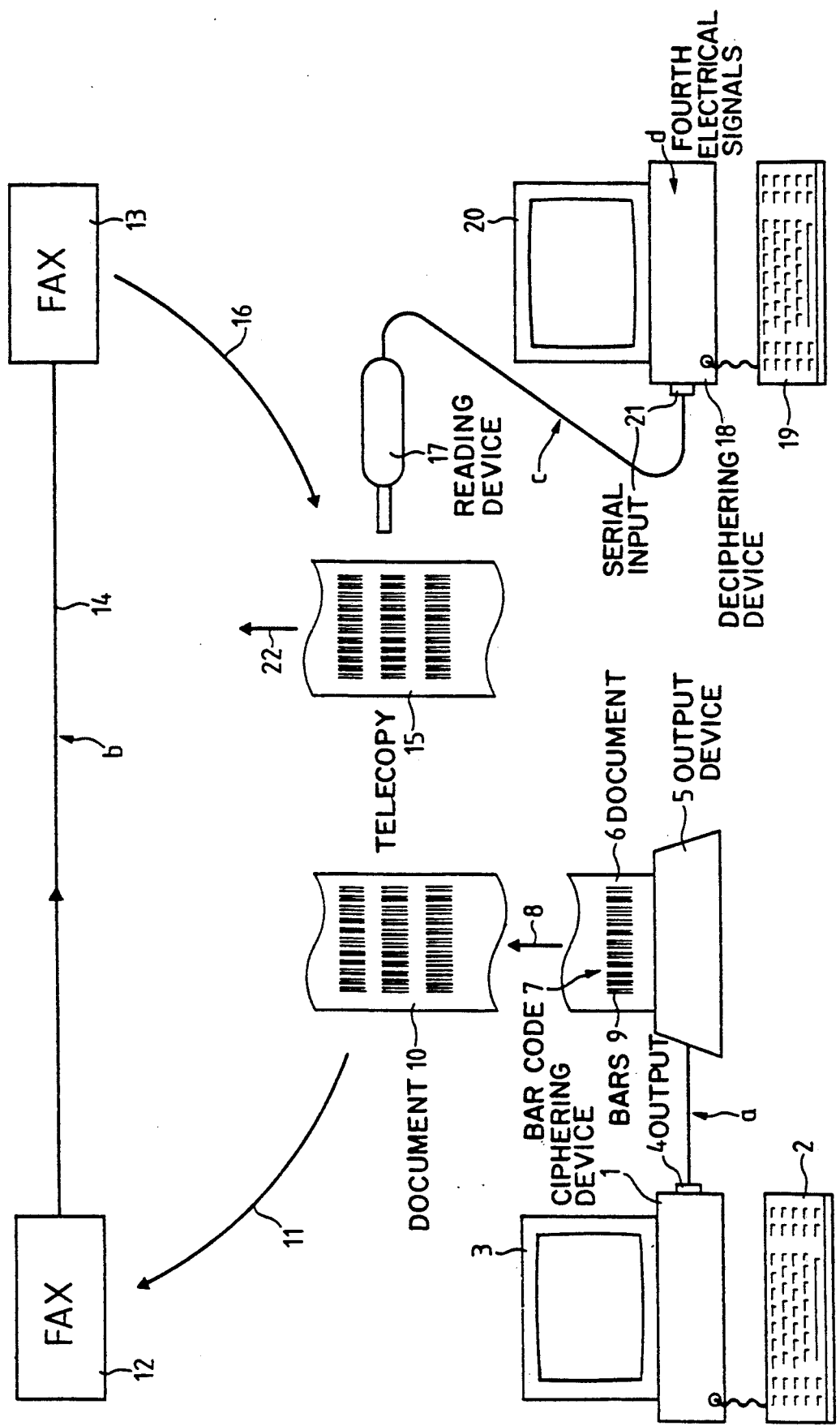

METHOD AND A DEVICE FOR THE PROTECTED TRANSMISSION OF DATA

BACKGROUND OF THE INVENTION

The invention relates to a method for the protected transmission of data with a telecopying system incorporating a sending device, a receiving device and a transmission link inbetween, as well as one device each at the transmitting and the receiving ends for the execution of the method.

It must be understood that in connection with the definition of the invention and the execution of the method according to the invention, no differences between the terms "device", "appliance", "apparatus" and other words of similar meaning are to be insinuated. The different parts of the system required for the execution of the method, which in relation to the transmitting link are located at the transmitting end or at the receiving end, can be separate, or partly or fully integrated.

Besides, it must be understood that in connection with the definition of the invention and the execution of the method according to the invention:

The qualification of a feature as "visible" signifies that the presence of this feature can be detected with the naked eye. However, it does not mean that the visible item can be clearly identified as sign, symbol, code or the like, and even less that the visible item clearly carries a piece of information that can be utilized by humans. For example, spots distributed at random on a document are "visible", but one cannot recognize in them any kind of writing and no sense whatsoever.

The qualification of a feature as "legible" signifies that the presence of this feature can be ascertained with the naked eye and that the visible item can be clearly identified as sign, symbol, code or the like. However, it does not mean that the visible item clearly carries a piece of information that can be utilized by humans. For example, characters of an unknown language put together in a certain order on a document are "legible", yet no sense is recognized in them, i.e. no information.

The qualification of a feature as "intelligible" signifies that (i) the presence of this feature can be ascertained with the naked eye and that (ii) the visible item can be clearly identified as sign, symbol, code or the like, and that (iii) it clearly carries a piece of information that can be utilized by humans. For instance, texts written on a document in a known set of characters and language are "intelligible".

Graphic representations can be visible, legible or intelligible, depending on their shape.

Encoding (ciphering) renders intelligible data non-intelligible but leaves them legible. Decoding (deciphering) renders non-intelligible but legible data intelligible.

Since encoded data is non-intelligible, its transmission in a telecopying system requires measures to be taken in order to guarantee its legibility, because illegible parts of data cannot be decoded anymore, which means that a part of the message to be transmitted has been finally lost.

The most obvious measure for the transmission of encoded data, while guaranteeing the decoding possibility, is error-free data transmission.

Error-free data transmission through a transmission link which is not distortion-free can in general be accomplished by means of transmission protocols and/or by the transfer of additional information: these measures permit a regeneration of the distorted information. The required additional information may be, for example, that the information is encoded in characters which can be recognized by a reading device in spite of a certain distortion (for example, the OCR-fonts were devised for this purpose). Yet, the transmission link must still meet certain minimum requirements as regards transmission safety; only if these minimum requirements have been met is it possible to transmit encoded and thus non-intelligible data.

These minimum requirements, however, will not have been met, if the transmission link is susceptible to errors and/or involves an optical interface having a high distortion factor. In this case, the transmission errors become so frequent and/or of such a kind that no error correction is possible, thus rendering the transmission of encoded and thus non-intelligible data impossible.

The nowadays customary telecopying system that scans a document line by line, and creates a copy of it, line by line, is an example of a transmission link with an optical interface, which possesses a high distortion factor. It is a known fact that the reproduction of the original on the telecopy of a telecopying system often contains already errors in the direction of the lines (full lines may be missing), even though in a yet tolerable measure. Nevertheless, at a right angle to the direction of the lines (i.e. in the direction of paper transport), there are often large distortions which may be so large that parts of the text may be missing or so illegible that somebody cannot even guess the meaning of a plain text by means of the copy and needs to request the repetition of the transmission.

Telecopying systems are already being developed that are not required to scan a document explicitly line by line and produce a copy of it line by line. For example, the document may be scanned by means of a matrix of CCD-sensors, thus resulting in extreme cases in an completely parallel and not in a serial scanning. Nevertheless, the signals supplied by the matrix must be transferred entirely serially (bit by bit) on a one-channel transmission link. While on a multi-channel transmission link the transmission is done in a parallel way (all bits of e.g. a byte or word in parallel), the transmission of the bytes or words is still serial. Thus, such telecopying systems are still operating in a serial mode, even though this is only implicit.

The same problems connected with serial transmission remain to be solved, regardless of whether the telecopying system operates explicitly or implicitly in a serial mode.

If the information transmitted is encoded data that is non-intelligible, there exists no possibility of correcting errors by means of the human intellect or of regenerating missing data. This can be deduced from the fact that encoded data possesses the character of random data. In such circumstances the transmission of encoded and thus non-intelligible data is impossible.

Yet, there is a demand for the transmission of encoded and thus non-intelligible data by way of a customary telecopying system. For example, business people on trips want to be able to take advantage of the telecopying facilities that are nowadays provided in modern hotels and press centers of exhibitions, fairs, etc. and that are accessible to the public, in order to transmit messages rapidly and with ease. On the other hand, and especially in these circumstances, there exists the great danger that also one's rivals learn about this exchange of information by telecopying machine in an unduly way, for example, by accidentally or on purpose reading the messages, for instance on the telecopier in the press center, or even by tapping of the transmission link.

Hence, it had been long-cherished, however, not possible so far to transmit a confidential piece of information by means of an entirely customary, publicly accessible telecopying system in a legible but non-intelligible way. The frequently deficient and heavily scattering quality of the data transmission of a telecopying system has so far not allowed to convert a plain text or a graphics into encoded data, to write it, for example, in OCR-font or in any given symbols on paper, to have the resulting document transmitted via a customary, publicly accessible telecopying system, to receive the transmitted copy of the document by means of a reading or recognition device (for example with a scanner with a recognition program for OCR-font or symbols), to decode the signals from the reading or recognition device in a deciphering device, and to print the decoded data or display it on the monitor: the transmission via a customary telecopying system is not good enough so as to guarantee at the receiving end that all OCR-characters or symbols will be recognized without errors, while an insecurity cannot be remedied by means of reasoning, as is the case with plain text, because the data are encoded. In the most unfortunate of cases, a read error may occur at the beginning of the transmitted message and render impossible the decoding of the entire piece of information.

Most recent developments in the field of telecopying systems give rise to expectations that before long telecopying systems will be available which are able to process also OCR-font with adequate transmission quality and optical resolution, thus guaranteeing at the receiving end that all OCR-characters will be recognized without error. Yet, the great existing amount of customary telecopying systems installed is not going to be replaced immediately and everywhere by telecopying systems of this new generation, not least for financial reasons. The previously mentioned disadvantages of the customary telecopying systems will therefore continue yet for quite some time and need to be overcome.

Therefore, it is the object of the invention to permit protected data transmission of non-intelligible data by using customary telecopying systems.

It is known to input the "original" data to be transmitted into a ciphering and output device that encodes it and outputs the resulting encoded data on a paper tape. The paper tape carries legible data as holes punched into the paper, however, which in their encoded form is non-intelligible for non-authorized persons. The paper tape is now fed into a sending device that scans the legible data on the paper tape line by line in combination with the line feed. The result of the scan is transmitted by the sending device as converted electric signals through a transmission link to a receiving device. The receiving device produces a copy of the punched paper tape according to the received signals, on which the data is legible but in its encoded form non-intelligible for non-authorized persons. This copy is fed into a reading and deciphering device which reads the data off the paper tape, deciphers it, and outputs the resulting deciphered data to an outputting device that restores the original data and makes it available for further processing as intelligible data on paper or at the monitor (for example by visualization, for machine control, etc.).

This known type of protected data transmission functions only in combination with a paper tape punch and a paper tape reader, which are compatible with the usual public telex system but not compatible with the usual public telecopying system. However, it is known that the public telex traffic is decreasing these days, while the public telecopying traffic is increasing strongly: hence, a solution based on punched paper tape and telex traffic does not correspond to the current circumstances and to user needs. The telecopying of a punched paper tape is not a reasonable alternative.

From DE-A-3230201 a system for the protected transmission of data is known that is equipped with a telecopying system comprising a sending device, a receiving device, and a transmission link in between. In this system the telecopying system is not a fully customary, publicly accessible telecopying system. The ciphering device is integrated with the sending device and the deciphering device with the receiving device. This system does not solve the previously stated object of the invention.

From U.S. Pat. No. 4,339,820 and GB-A-2101376 methods and devices for the ciphering and deciphering of intelligible data are known: The ciphered data is legible on a document as bar code. These methods and devices are in no way connected to any telecopying system and the art disclosed in U.S. Pat. No. 4,339,820 and GB-A-2101376 deals by no means with the solving of transmission problems. These methods and devices cannot contribute anything to the solution of the previously mentioned object of the invention.

SUMMARY OF THE INVENTION

The invention features a method for the protected transmission of data with a telecopying system having a sending device, a receiving device, and a transmission link in between, comprising the steps of:

(a) inputting the original intelligible data into a ciphering device that encodes it and converts the resulting encoded data into the corresponding first electric signals;

(b) feeding the first signals into an output device that creates a document on which the encoded data is legible in a code that is essentially insensitive in regard to transmission errors of the telecopying system;

(c) feeding the document to a sending device which scans the legible data on the document and converts the result of the scan into second electrical signals;

(d) transmitting the second signals from the sending device via the transmitting link to the receiving device;

(e) creating with the receiving device a copy of the document out of the received second signals, on which the data is legible in the code that is essentially insensitive to transmission errors of the telecopying system;

(f) feeding the copy to a reading device which reads the legible data on the copy and converts it into third electrical signals;

(g) feeding the third signals to a deciphering device that decodes the encoded data represented by the third signals and converts the resulting decoded data into fourth electrical signals; and (h) feeding the fourth signals to an output device which restores from them the original data and supplies it as intelligible data for further processing.

In a preferred embodiment of the invention apparatus for the execution of the method includes one single integrated system part at the transmitting end and one single integrated system part at the receiving end.

In another preferred embodiment of the invention the method utilizes a code that is essentially insensitive to the distortions occurring in a telecopying system in the direction of the line feed, since the heaviest distortions caused by a telecopying system occurs in the direction of the paper feed. In still another preferred embodiment the method uses a code of the aforementioned kind which is a binary code whose logic values can be distinguished through a contrast in brightness and/or color between written-on and blank sections of the document, which increases the compatibility of the method with a telecopying system.

Furthermore, in still another preferred embodiment the code utilizes a bar code written with bars being parallel to the direction of the line feed, since the bar code known per se is practically insensitive to distortions parallel to the lengthwise direction of the bars.

In still another preferred embodiment of the apparatus, a bar code reading device reads the legible data on the copy, for example a hand-held reader, a scanner, etc. An advantage of this embodiment is that business people may decode a message "on the road", in the hotel or even aboard a train or airplane, using portable reading devices such as handy bar code readers, which are nowadays commonly available and inexpensive, and using a laptop computer as a deciphering device with its monitor or portable printer as an output device.

Naturally, in an alternative embodiment of the invention the uses OCR-characters as code, provided that the telecopying system is capable of processing OCR-font with adequate transmission quality and optical resolution, so that all OCR-characters can be recognized without errors at the receiving end.

DESCRIPTION OF THE DRAWING

Subsequently, the invention will be described in further detail by means of an embodiment example of the method and the appended drawing, which includes a sole FIGURE showing an example of an installation for the protected transmission of data by means of which the method according to the invention is executed

DESCRIPTION OF THE PREFERRED EMBODIMENT

In the represented example, a ciphering device 1 consists of a computer with keyboard 2 and monitor 3 programmed for operation as ciphering device. The data to be transmitted in a protected way (the "original" data) is input by means of the keyboard 2. In the ciphering device 1 this data is encoded according to an appropriate ciphering system. Such ciphering systems are known per se. The resulting encoded data is converted by the ciphering device 1 into the corresponding first electric signals and supplied to an output 4 of the ciphering device I for onward routing. In the example described, the output 4 is a serial output of the computer and the first electric signals correspond to a set of alphanumeric and graphical characters, e.g. to a subset of the ASCII-code. However, other versions are possible, for example a parallel output and/or also another code, e.g. EBCDIC, etc.

From the output 4 of the ciphering device 1 the first electric signals are fed to an output device 5 which in the example described is a printer, for example a customary laser printer. In the example described the mentioned first electric signals "a" for example on a line connecting the output 4 with the output device 5, which is indicated by the corresponding arrow that points at the line. From the first electric signals the output device 5 creates a document 6 on paper on which the data is written as bar code 7 with bars 9 being parallel to the direction 8 of the printer line feed. While this data is legible, it is non-intelligible in its encoded form. Bar codes are known per se, in the example described the bar code 7 can be, for example, a bar code known as Code 128 (B) or as Code 39.

The document 6 is then removed from the printer and treated as independent document 10.

According to the invention, the document 10 is now transmitted by a telecopying system in order to supply a telecopy of it. Telecopying systems are well-known per se and it is for this reason that a telecopy sending device 12 and a telecopy receiving device 13 linked with one another via a transmitting link 14 are only implied in the drawing.

The document 10 is fed to the telecopy sending device 12 as is symbolized by the arrow 11. It is known that the legible data on the document 10, i.e. the bar code 7, is scanned line by line in the telecopy sending device 12 in combination with the line feed. In the telecopy sending device 12 the result of this scan is converted into second electric signals that are transmitted via the transmission link 14 to the telecopy receiving device 13. In the example described the mentioned second electric signals "b" appear also on the transmission link 14 which is implied by the corresponding arrow pointing at the transmission link 14.

From the received second signals the telecopy receiving device 13 creates a telecopy 15 of the document 10 on which the data is legible in encoded form but non-intelligible.

This telecopy 15 is then removed from the telecopy receiving device 13, as symbolized by the arrow 16, and fed into a reading device 17 that reads the legible data on the telecopy 15 and converts it into third electric signals "c". In the example described the reading device 17 is a customary bar code reading pen which can be connected to a computer and is handled manually. However, different modifications of the reading device 17 are possible, for example as automatically operated desktop model or as scanner, etc.

A deciphering device 18 consists of a computer with a keyboard 19 and a monitor 20 programmed for use as deciphering device. In the example described, the third signals are fed from the reading device 17 into the deciphering device 18 via a serial input 21 of the computer. However, different modifications are possible, for example a parallel input, a direct bus-connection, etc. In the example described the mentioned third electric signals "c" appear also on a line linking the reading device 17 with the deciphering device 18, which is implied by the arrow pointing at this line.

In the deciphering device 18 the encoded data represented by third signals is decoded according to the ciphering system used in the encoding process. Such a deciphering system is known per se. The resulting decoded data is converted into fourth electric signals and, in the example described, is fed to the monitor 20 functioning as output device in order to be displayed on it. In the example described the mentioned fourth electric signals "d" appear also on a not represented line linking the deciphering device 18 with the monitor 20, which is implied by the corresponding arrow pointing at the body of the deciphering device 18. Thus, the original data is restored in its intelligible form on the monitor 20 and made available for further processing. Again, different modifications are possible, for example, the output of data on a printer with or without simultaneous display on the monitor 20, an onward routing to a numerical data processing unit, or merely the storing in a file on a disk, ready for further processing.

It can be seen that a transmission of data may take place via a customary telecopying system by using the method according to the invention, a protected transmission of data being guaranteed at the same time. The original intelligible data cannot be perceived on the document 10 nor on the telecopy 15. On the other hand, legible data are present and perceivable on the document 10 as well as on the telecopy 15, while it is advantageous for the corresponding further processing that the data volume can be estimated.

Since the bar code is written in bars 9 parallel to the direction 8 of the printer line feed, the transmitted bar code on the telecopy 15 is essentially insensitive to transmission errors of the telecopying system parallel to the respective line feed direction 22 on the telecopy 15; thus, it essentially eliminates the problems caused by the distortions of a telecopying system in the line fee direction.

At a right angle to the direction 22, the sensitivity to transmission errors of the telecopying system depends on the resolution capacity of the reading device 17: the smaller this resolution capacity, the more tolerant is data transmission in relation to transmission errors of the telecopying system. The cost of this is that transmission gets slower, because the information density is smaller. Hence, transmission speed is inversely proportional to the resolution with which the data is written and read in a code being essentially insensitive to transmission errors of the telecopying system. It is possible for the expert to arrive at this compromise by means of several experiments without further inventive activity.

Basically, it is possible to use another binary code instead of the bar code in order to represent the data on the document 10 and on the telecopy 15. It is typical of an appropriate binary code that its logical values can be distinguished by means of a contrast in brightness and/or color between written-on and blank sections of the document. This provision distinguishes such a code, for example, from paper tape code punched into paper. Also the appropriate contrast in brightness and/or color can be ascertained by the person skilled in the art in several experiments without any additional inventive activity. In this process, the contrast value to be required by the output device 5 between written-on and blank sections of the document 6 is also due to the specificities of the telecopying system and the reading device 17 so that the specification of a contrast value is useful only for a specified installation. Besides, such a specification would correspond only to the specificities of currently available installations and not take into consideration further developments of these installations.

The invention has been described above by means of a preferred embodiment of the method and its modifications. However, it must be understood that the person skilled in the art can modify the described embodiment and its specificities and may introduce other modifications without leaving the invention defined in the claims.

In particular, the method according to the invention may also use, as has already been mentioned, OCR-characters or given symbols as code, if the telecopying system is able to sufficiently guarantee the necessary transmission quality and optical resolution.

For reasons of clarity, the example of a system for the execution of the method was represented, in which the system parts consist of separated devices. However, a version of the embodiment is preferred in which the various parts of the system necessary for the execution of the method located at the transmitting or at the receiving end are designed and integrated as components of a device located at the transmitting or at the receiving end. The preferred transmitting-end device comprises the ciphering device 1 and the output device 5 as well as the previously described accessories. The preferred receiving-end device comprises the reading device 17, the deciphering device 18 and the output device 20 as well as the previously described accessories.

We claim:

1. A Method for the protected transmission of data with a telecopying system comprising a sending device (12), a receiving device (13), and a transmission link (14) in between, comprising the steps of:

inputting original intelligible data into a ciphering device (1) that encodes it into resulting encoded data, which is concerted into corresponding first electric signals (a), feeding the first electrical signals (a) into an output device (5) that creates a document (6, 10) having thereon legible encoded data (7) in a code that is essentially insensitive in regard to transmission errors of a telecopying system, feeding the document (6, 10) to a sending device (12) which scans the legible encoded data (7) on the document to produce second electrical signals (b) representative of said legible encoded data, transmitting the second electrical signals (b) from the sending device (12) via a transmission link (14), feeding the second electrical signal (b) to a receiving device (13) that creates a copy (15) of the document (6, 10) from the received second signals (b), on which is produced the legible encoded data (7) in the code that is essentially insensitive to transmission errors of the telecopying system, feeding the copy (15) to a reading device (17) which reads the legible encoded data (7) on the copy and converts it into corresponding third electrical signals (c), feeding the third electrical signals (c) to a deciphering device (18) that decodes it to produce resulting decoded data, which is converted into corresponding fourth electrical signals (d), and feeding the fourth electrical signals (d) to an output device (20) which converts the fourth signals (d) into a true copy of the original intelligible data for further processing.

2. A method according to claim 1 characterized in that the used code is essentially insensitive to the distortions that occur in the direction of the line feed in telecopying systems with a line-by-line scan in combination with the line feed (8).

3. A method according to claim 2 characterized in that the code is a binary code whose logical values can be distinguished by means of a contrast in brightness and/or color between written-on and blank sections of the document.

4. A method according to claim 3 characterized in that the code is a bar code with bars (9) being parallel to the line feed direction (8).

5. A method according to claim 4 characterized in that the legible data on the copy (15) is read by a bar code reading device (17).

6. A transmitting-end device for performing the method of claim 1, having
- a ciphering device (1) into which the original data is input in order to encode it and convert the resulting encoded data into the corresponding first electric signals (a), and
- an output device (5) into which the first signals (a) are fed in order to create a document (6, 1) out of them on which the data (7) is legible, characterized in that the ciphering device (1) and the output device (5) are integrated in the transmitting-end device and that the later is destined and designed to write the legible data (7) on the document (6, 10) in a code that is essentially insensitive to transmission errors of a telecopying system.

7. A transmitting-end device according to claim 6 characterized in that the code being essentially insensitive to transmission errors of a telecopying system is a bar code.

8. A transmitting-end device according to claim 7 characterized in that the code being essentially insensitive to transmission errors of a telecopying system is a bar code.

9. A receiving-end device for performing the method of claim 1, having
- a reading device (17) to which the copy is fed in order to read the legible data on the copy and convert it into third electric signals (c),
- a deciphering device (18) into which the third signals are fed in order to decode the encoded data they represent and convert the resulting decoded data into fourth electric signals (d), and
- an output device (20) into which the fourth signal (d) are fed in order to restore from them the original data and make them available for further processing in the form of intelligible data, characterized in that the reading device (17), the ciphering device (18) and the output device (20) are integrated in the receiving-end device and that the latter is destined and designed to read and encode the legible data (7) on the copy (15) written in a code that is essentially insensitive to transmission errors of a telecopying system.

10. A method for the protected transmission of data with a telecopying system comprising a facsimile sending device (12), a facsimile receiving device (13), and a transmission link (14) in between, comprising the steps of:
- inputting original intelligible data into a computerized ciphering device (1) that encodes it into resulting encoded data, which is converted into corresponding first electric signals (a);
- receiving the first electrical signals (a) into an output printer device (5) that feeds a document (6, 10) in a line feed direction (22) and prints legible bar code data (7) there in a bar code format with vertical bars (9) being substantially parallel to the line feed direction to minimize transmission errors by the telecopying system,
- scanning the document (6, 10) with a facsimile sending device (12) that reads the bar code data (7), which is converted into corresponding second electrical signal (b);
- transmitting the second electrical signals (b) from the facsimile sending device (12) via a transmission link (14);
- receiving the second electrical signals (b) with a receiving facsimile device (13) that produces a telecopy (15) of the document (6, 10) by printing the legible bar code data (7) in a bar code format with bars (9) being substantially parallel to the line feed direction to minimize transmission errors by the telecopying system;
- reading the copy (15) with a bar code read device (17) that converts the legible bar code data (7) on the telecopy (15) into corresponding third electrical signals (c);
- decoding the third electrical signals (c) with a computerized deciphering device (18) that produces binary decoded data, which is converted into corresponding fourth electrical signals (d); and
- converting the fourth signals (d) with an output device (20) into a true copy of the original intelligible data for further processing.

11. Apparatus for the protected transmission of data with a telecopying system comprising a second device (12), a receiving device (13), and a transmission link (14) in between, comprising:
- a ciphering device (1) for receiving original intelligible data and encoding it into resulting encoded data, which is converted into corresponding first electric signals (a);
- a first output device (5) for receiving the first electrical signals (a) and creating a document (6, 10) having thereon legible encoded data (7) in a code that is essentially insensitive to transmission errors of the telecopying system;
- a sending device (12) for receiving the document (6, 10) and scanning the legible encoded data (7) on the document (6, 10) to produce second electrical signals (b) representative of said legible encoded data (7);
- a transmission link (14) for transmitting the second electrical signals (b) from the sending device (12);
- a receiving device (13) for receiving the second electrical signals (b) and creating a copy (15) of the document (6, 10) therefrom, by producing the legible encoded data (7) in the code that is essentially insensitive to transmission errors of the telecopying system;
- a reading device (17) for receive the copy (15), reading the legible encoded data (7) on the copy, and converting it into corresponding third electrical signal (c);
- a deciphering device (18) for receiving the third electrical signals (c) and decoding it to produce resulting decoded data, which is concerted into corresponding fourth electrical signals (d); and
- a second output device (20) for receiving the fourth electrical signal (d) and converting it into a true copy of the original intelligible data for further processing.

12. Apparatus for the protected transmission of data with a telecopying system comprising a second device (12), a receiving device (13), and a transmission link (14) in between, comprising:
- a ciphering device (1) for receiving original intelligible data end including it into resulting encoded data, which is converted into corresponding first electrical signals (a);

an output device (5) for receiving the first electrical signals (a) and creating a document (6, 10) having thereon legible encoded data (7) in a code that is essentially insensitive to transmission errors of a telecopying system;

a sending device (12) for receiving the document (6, 10) and scanning the legible encoded data (7) on the document (6, 10) to produce resulting scanned data, which is converted into corresponding second electrical signals (b);

a transmission link (14) for transmitting the second electrical signals (b) from the sending device (12);

a receiving device (13) for receiving the second electrical signals (b) and creating a copy (15) of the document (6, 10) therefrom, by producing the legible encoded data (7) in the code that is essentially insensitive to transmission errors of a telecopying system;

a reading device (17) for receiving the copy (15), reading the legible encoded data (7) on the copy, and converts it into corresponding third electrical signals (c);

a deciphering device (18) for receiving the third electrical signals (c) and decoding it to produce resulting decoded data, which is converted into corresponding fourth electrical signals (d);

an output deice (20) for receiving the fourth electrical signals (d) and converting it into a true copy of the original intelligible data for further processing;

the ciphering device (1) and the output device (5) are integrated in a transmitting-end device that prints the legible data (7) on the document (6, 10) in a code that is essentially insensitive to transmission errors of a telecopying system; and the reading device (17), the deciphering device (18) and the output device (20) are integrated in a receiving-end device that reads and encodes the legible data (7) on the copy (15) written in a code that is essentially insensitive to transmission errors of a telecopying system.

13. Apparatus for the protected transmission of data with a telecopying system comprising a facsimile sending device (12), a facsimile receiving device (13), and a transmission link (14) in between, comprising a computerized ciphering device (1) for receiving original intelligible data and encoding it into encoded data, which is converted into corresponding first electric signals (a);

an output printer device (5) for receiving the first electrical signals (a), which feeds a document (6, 10) in a line feed direction (22) and prints legible bar code data (7) thereon in a bar code format with vertical bars (9) being substantially parallel to the feed direction to eliminate distortion which causes transmission errors by a telecopying system;

a facsimile sending device (12) for scanning the document (6, 10) to read the bar code data (7), which is converted into corresponding second electrical signals (b);

a transmission link (14) for transmitting the second electrical signals (b) from the facsimile send device (12);

a receiving facsimile device (13) for receiving the second electrical signals (b), which prints a telecopy (15) of the document (6, 10) also having the legible bar code data (7) in the form of a bar code with bars (9) being substantially parallel to a line feed direction to eliminate distortion which causes transmission errors by a telecopying system;

a bar code reading device (17) for reading the copy (15) and converting the legible bar code data (7) on the telecopy (15) into corresponding third electrical signals (c);

a computerized deciphering device (18) for decoding the third electrical signals (c) to reduce resulting decoded data, which is converted into corresponding fourth electrical signals (d); and an output device (20) for converting the fourth signal (d) into a true copy of the original intelligible data for further processing.

* * * * *